(No Model.)
T. HARTLEY.
WHEEL.
No. 513,782. Patented Jan. 30, 1894.
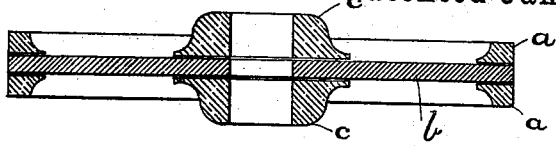
Fig. A.
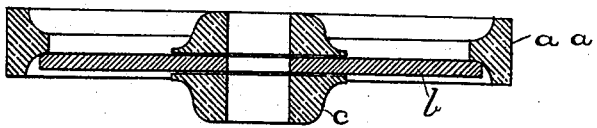
Fig. B.
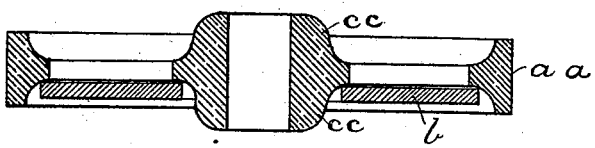
Fig. C.
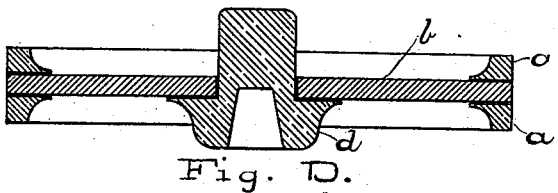
Fig. D.
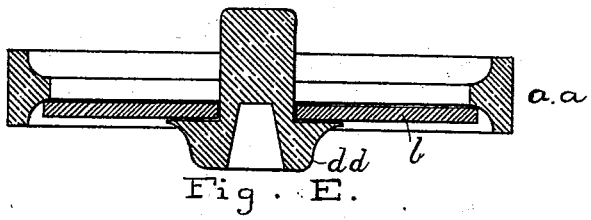
Fig. E.
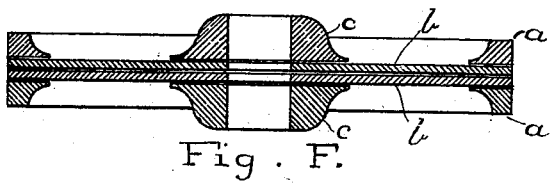
Fig. F.
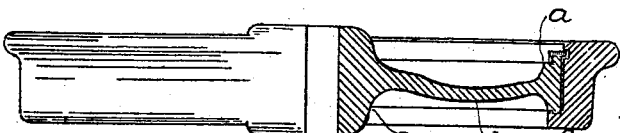
Fig. G.
WITNESSES
E. B. Bolton
E. K. Sturtevant
INVENTOR
Thomas Hartley
By Richards
his Attorneys.
THE NATIONAL LITHOGRAPHING COMPANY,
WASHINGTON, D. C.

UNITED STATES PATENT OFFICE.

THOMAS HARTLEY, OF HANDSWORTH, ENGLAND.

WHEEL.

SPECIFICATION forming part of Letters Patent No. 513,782, dated January 30, 1894.

Application filed March 29, 1893. Serial No. 468,199. (No model.) Patented in England October 10, 1892, No. 18,034.

*To all whom it may concern:*

Be it known that I, THOMAS HARTLEY, a subject of the Queen of Great Britain and Ireland, and a resident of 155 Hamstead Road, Handsworth, in the county of Stafford and Kingdom of England, have invented a certain new and useful Improvement in Wheels, (for which I have obtained a patent in Great Britain, No. 18,034, bearing date October 10, 1892,) of which the following is a specification.

This invention consists in the mode of manufacturing various kinds of disk centers for wheels with or without steel tires used for steam cars, street cars and other purposes.

Referring to the drawings which form part of this specification Figures A, B, C, D, E, and F, illustrate the various modes described in the specification as processes, first, second, third, fourth, fifth, and sixth, and Fig. G shows in part elevation and part section a disk center after having been stamped and finished.

First. I proceed in the following manner:— I take a plate (b) of either steel or iron the diameter and thickness of the disk center required (with allowances for working the same) and on each side of the plate in the center I place a washer (c) to form the boss and on the outer diameter of the plate I place a ring (a) on each side to form the rim as shown in Fig. A on drawings. All the parts are then heated to a welding heat and welded together in a die or dies either by hammering, pressing or rolling at one heat and finished to the required shape at one operation.

Second. I have a rim (a a) rolled the required section with a projection on the inner side. I then take a plate (b) large enough to overlap the inner projection of the rim as shown in Fig. B on drawings. To form the boss I proceed as in Fig. A on drawings. The whole is then welded up as described in process the first.

Third. I have a rim rolled as in process the second and a boss (c c) stamped or pressed with an outer projection corresponding with the inner projection on rim. I then take a plate (b) large enough to overlap the inner projection on rim and the outer projection on boss as shown in Fig. C on drawings. The whole is then welded up as described in process the first.

Fourth. I proceed as in process the first to form rim (a) and body (b) but to form the boss I take an ingot or forging (d) and insert it through a hole in plate (b) which forms the body as shown in Fig. D on drawings. The whole is then welded up as described in process the first.

Fifth. I have a rim (a a) rolled as described in processes second and third. I then take a plate (b) large enough to overlap the inner projection on rim and through a hole in the center of the plate (b) I insert an ingot or forging (d d) large enough to form the boss as shown in Fig. E on drawings. The whole is then welded up as described in process the first.

Sixth. In order to make a very strong and rigid web or body of disk center I take two plates half the required thickness and place them together with the grain of the iron or steel running in opposite directions as shown in Fig. F on drawings. I then proceed as described in process the first.

It will be seen that the various modes described in processes first, second, third, fourth, fifth, and sixth, and shown on Figs. A, B, C, D, E, and F on drawings may be modified in carrying out the same without departing from the invention.

I have shown in Fig. G on drawings a disk center after having been stamped and finished which is fitted with a steel tire and clip ring.

I am aware that disk wheels have been made in Germany but upon quite a different system to what is above described. I am also aware that various attempts have been made in Great Britain to stamp disk centers from an ingot of steel or iron but without success.

It will be understood that the double web of Fig. F may be used in connection with the forms of wheels shown in the other figures.

Having now described my invention, what I claim as new, and desire to secure by Letters Patent, is—

1. The herein described car wheel consisting of the hub, the web and the two independent rim sections on opposite sides of the web, said parts being welded together, substantially as described.

2. A car wheel consisting of the hub and rim with the web formed of two plates placed with the grain running in opposite directions, said parts being welded together, substantially as described.

3. In combination, the two independent web sections, the two independent hub sections, and the two independent rim sections all of said parts being welded together, substantially as described.

In witness whereof I have hereunto set my hand in presence of two witnesses.

THOMAS HARTLEY.

Witnesses:
HENRY F. TALBOT,
WALTER BERNARD CARROLL.